United States Patent
van Hassel et al.

(10) Patent No.: US 11,040,306 B2
(45) Date of Patent: Jun. 22, 2021

(54) FUEL TANK INERTING SYSTEM

(71) Applicant: HAMILTON SUNDSTRAND CORPORATION, Charlotte, NC (US)

(72) Inventors: Bart Antonie van Hassel, Weatogue, CT (US); Robert Mason Darling, South Windsor, CT (US); Michael L. Perry, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 271 days.

(21) Appl. No.: 15/946,211

(22) Filed: Apr. 5, 2018

(65) Prior Publication Data
US 2019/0308134 A1    Oct. 10, 2019

(51) Int. Cl.
*B01D 53/32* (2006.01)
*B64D 13/06* (2006.01)
*B64D 37/32* (2006.01)
*H01M 8/04082* (2016.01)
*A62C 99/00* (2010.01)
*A62C 3/08* (2006.01)
*H01M 8/1067* (2016.01)
*H01M 8/083* (2016.01)
*A62C 3/06* (2006.01)

(52) U.S. Cl.
CPC ............ *B01D 53/326* (2013.01); *A62C 3/065* (2013.01); *A62C 3/08* (2013.01); *A62C 99/0018* (2013.01); *B64D 13/06* (2013.01); *B64D 37/32* (2013.01); *H01M 8/04201* (2013.01); *H01M 8/083* (2013.01); *H01M 8/1067* (2013.01); *B01D 2256/10* (2013.01); *B01D 2257/104* (2013.01); *B01D 2257/504* (2013.01); *B01D 2259/4575* (2013.01); *B64D 2013/0603* (2013.01); *H01M 2300/0014* (2013.01); *H01M 2300/0082* (2013.01)

(58) Field of Classification Search
CPC .... B01D 53/326; H01M 8/04201; A62C 3/08; A62C 2259/4575
See application file for complete search history.

(56) References Cited

U.S. PATENT DOCUMENTS

| 5,131,225 A | 7/1992 | Roettger |
| 7,438,986 B2 | 10/2008 | Shimotori et al. |
| 7,887,966 B2 | 2/2011 | Darling et al. |
| 8,048,582 B2 | 11/2011 | Darling et al. |
| 8,182,954 B2 | 5/2012 | Darling et al. |
| 9,623,981 B2 | 4/2017 | Darling et al. |
| 2017/0167036 A1 | 6/2017 | Tew et al. |
| 2017/0167037 A1 | 6/2017 | Rheaume |
| 2017/0331131 A1 | 11/2017 | Rheaume |
| 2017/0341019 A1 | 11/2017 | Rheaume et al. |

FOREIGN PATENT DOCUMENTS

| DE | 102005053694 B3 | 1/2007 |
| EP | 3023518 A1 | 5/2016 |
| JP | 2008080211 | * 4/2008 |
| WO | 0113453 A1 | 2/2001 |

OTHER PUBLICATIONS

Dekel; "Review of Cell Performance in Anion Exchange Membrane Fuel Cells"; Journal of Power Sources; No. 375; 2018; pp. 158-169.
European Search Report Issued in European Application No. 19167279.9 dated Aug. 26, 2019; 10 Pages.
Dario R. Dekel et al., "Steady state and transient simulation of anion exchange membrane fuel cells", Journal of Power Sources, 2017, 14 pages.

* cited by examiner

*Primary Examiner* — Ladan Mohaddes
(74) *Attorney, Agent, or Firm* — Cantor Colburn LLP

(57) ABSTRACT

A fuel tank inerting system is disclosed, comprising a fuel tank and an electrochemical cell comprising a cathode and an anode separated by a separator comprising an anion transfer medium. A cathode fluid flow path is in operative fluid communication with a catalyst at the cathode between a cathode fluid flow path inlet and a cathode fluid flow path outlet. An anode fluid flow path is in operative fluid communication with a catalyst at the anode, and includes an anode fluid flow path outlet. An electrical connected to a power source is arranged to provide a voltage difference between the anode and the cathode. An air source is in operative fluid communication with either or both of the cathode flow path inlet and the anode flow path inlet. An inert gas flow path is in operative fluid communication with the cathode flow path outlet and the fuel tank.

8 Claims, 5 Drawing Sheets

FUEL TANK INERTING SYSTEM

BACKGROUND

The subject matter disclosed herein generally relates to fuel handling systems, and more particularly to fuel tank inerting systems such as used on aircraft.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space, also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) (i.e., oxygen-depleted air or ODA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen and water molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system and anti-ice systems. Moreover, certain flight conditions such as during aircraft descent can lead to an increased demand for NEA at precisely the time when engines could be throttled back for fuel savings so that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems to improve fuel efficiency, as well as reduce weight and lifecycle costs. Other aircraft architectures may adopt low-pressure bleed configurations where engine design parameters allow for a bleed flow of compressed air, but at pressures less than the 45 psi air (unless stated otherwise, "psi" as used herein means absolute pressure in pounds per square inch, i.e., psia) that has been typically provided in the past to conventional onboard environmental control systems. A separate compressor or compressors can be used to provide pressurized air to the membrane gas separator, but this undesirably increases aircraft payload, and also represents another onboard device with moving parts that is subject to maintenance issues or device failure.

BRIEF DESCRIPTION

A fuel tank inerting system is disclosed, comprising a fuel tank and an electrochemical cell comprising a cathode and an anode separated by a separator comprising an anion transfer medium. A cathode fluid flow path is in operative fluid communication with a catalyst at the cathode between a cathode fluid flow path inlet and a cathode fluid flow path outlet. An anode fluid flow path is in operative fluid communication with a catalyst at the anode, and includes an anode fluid flow path outlet. An electrical connected to a power source is arranged to provide a voltage difference between the anode and the cathode. An air source is in operative fluid communication with either or both of the cathode flow path inlet and the anode flow path inlet. An inert gas flow path is in operative fluid communication with the cathode flow path outlet and the fuel tank.

In any one or combination of the foregoing embodiments, the anode fluid flow path is in fluid communication with the catalyst at the anode between an anode fluid flow path inlet and the anode fluid flow path outlet.

In any one or combination of the foregoing embodiments, the system further comprises a regenerative or replaceable carbon dioxide absorber in operative fluid communication with the air source and the cathode fluid flow path.

In any one or combination of the foregoing embodiments, the system further comprises a water source in operative fluid communication with the cathode fluid flow path.

A fuel tank inerting and power generation system is disclosed, comprising the fuel tank inerting system of any one or combination of the foregoing embodiments, an electrical connection between a power sink and the anode and cathode, and a controller configured to alternatively operate the electrochemical cell in a mode selected from a plurality of modes. The plurality of modes includes a first mode in which air and water is directed to the cathode, electric power is directed from the power source to the anode and cathode to provide a voltage difference between the anode and the cathode, and oxygen-depleted air is directed from the cathode to the fuel tank. The plurality of modes also includes a second mode in which fuel is directed to the anode, electric power is directed from the anode and cathode to the power sink, and oxygen-depleted air is directed from the cathode to the fuel tank.

Also disclosed is an aircraft fuel tank inerting system comprising an aircraft body and an engine, in which the engine is in operative fluid communication with the fuel tank of the fuel tank inerting system of any one or combination of the foregoing embodiments.

Also disclosed is an aircraft fuel tank inerting and air management system comprising the fuel tank inerting system of any one or combination of the foregoing embodiments and a cabin air flow circulation path in operative fluid communication with a pressurized environmentally controlled cabin and the anode fluid flow path inlet and anode fluid flow path outlet.

Also disclosed is a method of inerting a fuel tank. According to the method air and water is contacted with an electrically charged cathode to react oxygen in the air with the water and electrons at the cathode to produce hydroxyl ions and an oxygen-depleted gas. The oxygen depleted gas is transported from the cathode to the fuel tank, and the hydroxyl ions are transported from the cathode across a separator to an anode, where they are oxidized to produce oxygen, water, and electrons.

In some embodiments, the method further includes removing carbon dioxide from the air contacted with the cathode.

In any one or combination of the foregoing embodiments, the method further includes adding water to air from an air source, and delivering the air and water to the cathode.

In any one or combination of the foregoing embodiments, the method further includes delivering oxygen-enriched air from the anode to an air conditioned space.

In any one or combination of the foregoing embodiments, the method further includes operating in a mode selected from a plurality of modes. The plurality of modes includes a first mode in which air and water is directed to the cathode, electric power is directed from the power source to the anode and cathode to provide a voltage difference between the anode and the cathode, and oxygen-depleted air is directed from the cathode to the fuel tank. The plurality of modes also includes a second mode in which fuel is directed to the anode, electric power is directed from the anode and cathode to the power sink, and oxygen-depleted air is directed from the cathode to the fuel tank.

In any one or combination of the foregoing embodiments, the anion transfer medium comprises a cationic ionomer or a liquid electrolyte.

In any one or combination of the foregoing embodiments, the anion transfer medium comprises a cationic ionomer comprising any one or combination of quaternary ammonium groups, quaternary pyridinium groups, quaternary imidazolium groups, amino groups, or imidazole groups.

In any one or combination of the foregoing embodiments, the cationic ionomer comprises quaternary ammonium groups.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
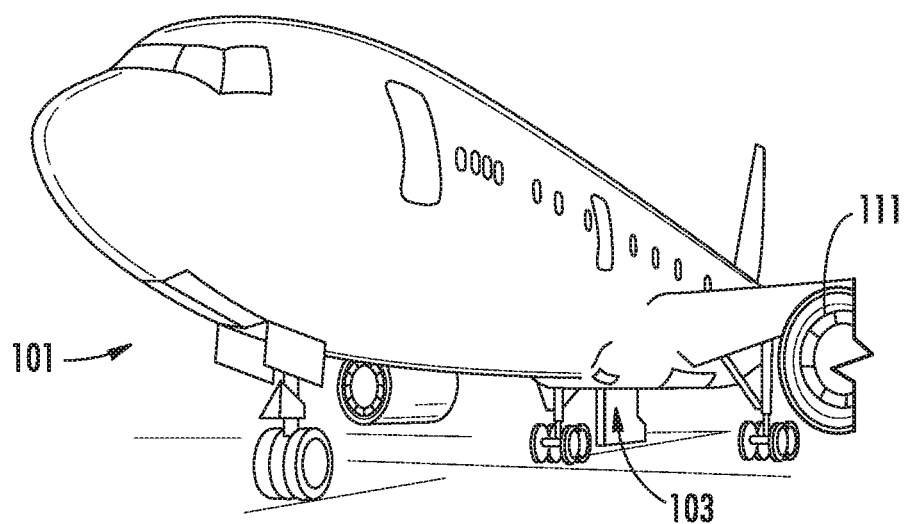
FIG. 1A is a schematic illustration of an aircraft that can incorporate various embodiments of the present disclosure.
Figure 1B:
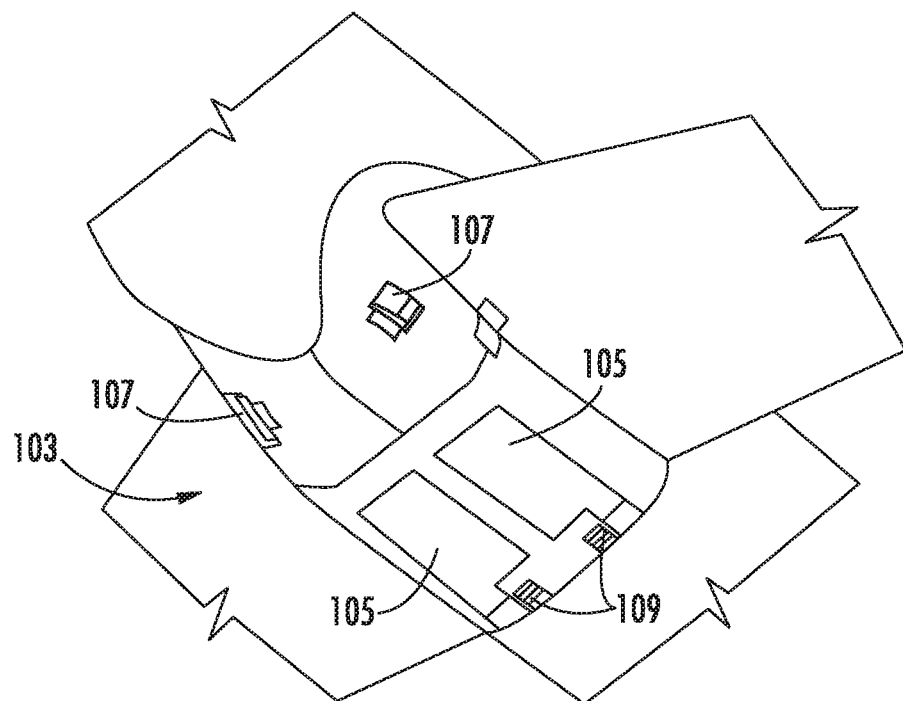
FIG. 1B is a schematic illustration of a bay section of the aircraft of FIG. 1A.

A detailed description of one or more embodiments of the disclosed apparatus and method are presented herein by way of exemplification and not limitation with reference to the Figures As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on wings of the aircraft and are connected to fuel tanks (not shown) in the wings, but may be located at other locations depending on the specific aircraft configuration. In some aircraft configurations, air can be bled from the engines 111 and supplied to environmental control systems and/or fuel inerting systems, as will be appreciated by those of skill in the art.

Figure 2:
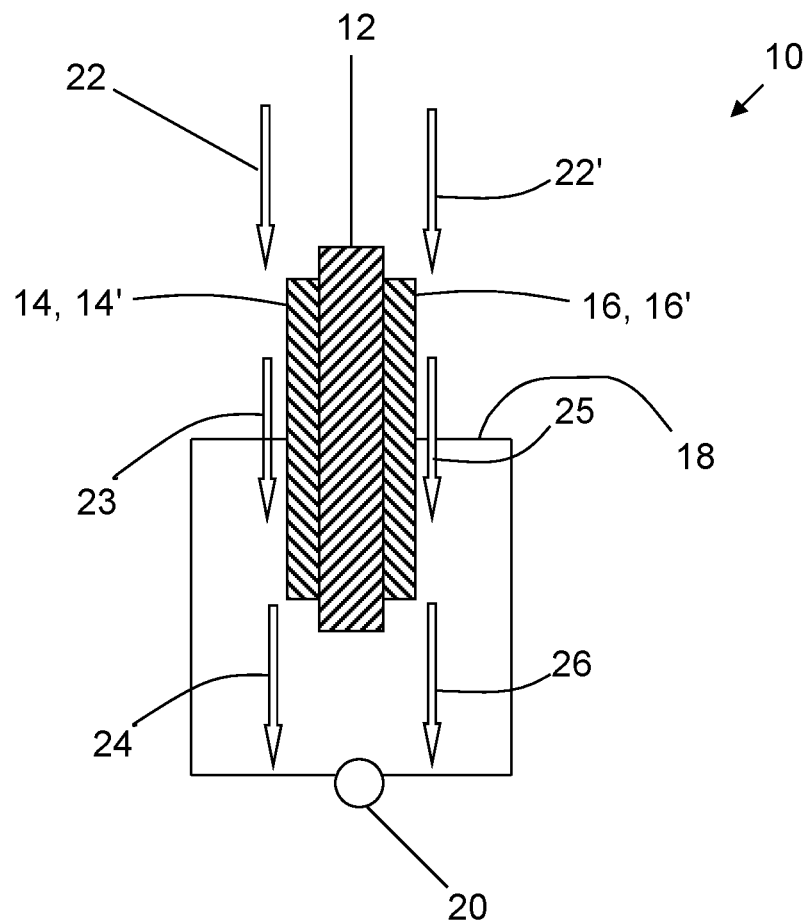
FIG. 2 is a schematic illustration of a membrane electrode assembly that can incorporate various embodiments of the present disclosure.

Referring now to FIG. 2, a membrane electrode assembly (MEA) 10 is schematically depicted. The MEA 10 comprises a separator 12 that includes an anion transfer medium. Some types of anion transfer separators can also be referred to as anion exchange membranes (AEM's). As shown in FIG. 2, the separator 12 has a cathode 14 disposed on one side and an anode 16 disposed on the other side. Exemplary materials from which the separator 12 can be fabricated include anion-conducting ionomers and ion-exchange resins. Ionomers and ion-exchange resins useful as anion conducting materials (i.e., anion transfer media) can include hydrocarbon-based resins or fluorocarbon-type resins. Fluorocarbon-type resins typically exhibit excellent resistance to oxidation by peroxides, radical species, and, strong bases. Other resins include various hydrocarbon-based resins resistant to conditions encountered during operation, including but not limited to polypropylene, polysulfones, polyether ketones, or polybenzimidazoles. Anion exchange resins can include polymers with anion conductive functional groups, including but not limited to quaternary ammonium groups, quaternary pyridinium groups, quaternary imidazolium groups, amino groups, or imidazole groups. In some embodiments, the anion exchange resin includes quaternary ammonium groups as anion conductive functional groups. In some embodiments, the separator 12 can include a porous polymer structure of a polymer that does not have to contain anion conductive groups, with pore spaces containing a polymer that comprises anion conductive functional groups. Alternatively, instead of a solid polymer membrane, the anion ion-exchange transfer medium can include a liquid electrolyte, such as potassium hydroxide (KOH) or sodium hydroxide (NaOH), which may be absorbed in a porous-solid matrix material such as a layer of silicon carbide or a polar polymer such as a polybenzimidazole that can absorb significant quantities of the liquid electrolyte. Cathode 14 and anode 16 can be fabricated from catalytic materials suitable for performing the needed electrochemical reaction (e.g., the oxygen-reduction reaction at the cathode and the oxidation of hydroxyl ions at the anode). Exemplary catalytic materials include, but are not limited to, nickel, platinum, palladium, rhodium, carbon, gold, tantalum, titanium, tungsten, ruthenium, iridium, osmium, zirconium, alloys thereof, and the like, as well as combinations of the foregoing materials. Some organic materials and metal oxides can also be used as catalysts, as contrasted to electrochemical cells utilizing proton exchange membranes where the conditions preclude the use of metal oxide catalysts. Examples of metal oxide catalysts include, but are not limited to ruthenium oxides, iridium oxides or transition-metal oxides, generically depicted as $M_xO_y$, where x and y are positive numbers [capable of forming a stable catalytic metal oxide such as $Co_3O_4$. Cathode 14 and anode 16, including catalyst 14' and catalyst 16', are positioned adjacent to, and preferably in contact with the separator 12 and can be porous metal layers deposited (e.g., by vapor deposition) onto the separator 12, or can have structures comprising discrete catalytic particles adsorbed onto a porous substrate that is attached to the separator 12. Alternatively, the catalyst particles can be deposited on high surface area powder materials (e.g., graphite or porous carbons or metal-oxide particles) and then these supported catalysts may be deposited directly onto the separator 12 or onto a porous substrate that is attached to the separator 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the separator 12. In either case, the cathode and anode layers 14 and 16 may also include a binder material, such as a polymer, especially one that also acts as an ionic conductor such as anion-conducting ionomers. In some embodiments, the cathode and anode layers 14 and 16 can be cast from an "ink," which is a suspension of supported (or unsupported) catalyst, binder (e.g., ionomer), and a solvent that can be in a solution (e.g., in water or a mixture of alcohol(s) and water) using printing processes such as screen printing or ink jet printing.

During operation of the system, oxygen from air source 22 and water at the cathode undergo a redox reaction according to the formula

$$O_2 + 2H_2O + 4e^- \rightarrow 4OH^- \quad (1)$$

The electrons used by this reaction are provided by an electrical connection 18 powered by electric power source 20 connecting the negatively charged cathode 14 with the anode 16. The hydroxyl ions produced by this reaction migrate across the separator 12, where they are oxidized at the anode according to the formula

$$4OH^- \rightarrow O_2 + 2H_2O + 4e^- \quad (2).$$

The air source 22 can be any type of air source such as a fan, compressor, ram airflow on an aircraft, an air circulation flow path on an aircraft or other conditioned air space (e.g., an aircraft cabin air circulation flow path), or an air conditioning system process flow path (e.g., an aircraft environmental control system (ECS) process flow path). The air from air source 22 enters a cathode fluid flow path 23 at a cathode fluid flow path inlet and flows along the cathode 14 where the reaction (1) depletes oxygen from the air. Oxygen depleted air (ODA) exits the cathode fluid flow path 23 at a cathode fluid flow path outlet and proceeds along an inert gas flow path 24 to a fuel tank for which inerting is needed. Oxygen produced at the anode enters anode fluid flow path 25 and is discharged with the anode exhaust 26. As mentioned above, the electrolysis reaction occurring at the negatively charged cathode 14 requires water, and the ionic polymers used for separator 12 may perform more effectively in the presence of water. Although the reactions (1) and (2) are stoichiometrically balanced with respect to water so that there is no net consumption of water, in practice moisture can be removed by air flowing along the cathode flow path 23 and/or the anode flow path 25 (either entrained or evaporated in the air) as it exits from the region of cathode 14 and anode 16. Accordingly, in some exemplary embodiments, a water source can be in operative fluid communication with either or both of the cathode fluid flow path 23 and the anode fluid flow path 25, as illustrated in an example embodiment shown in FIGS. 3 and 4.

Figure 3:
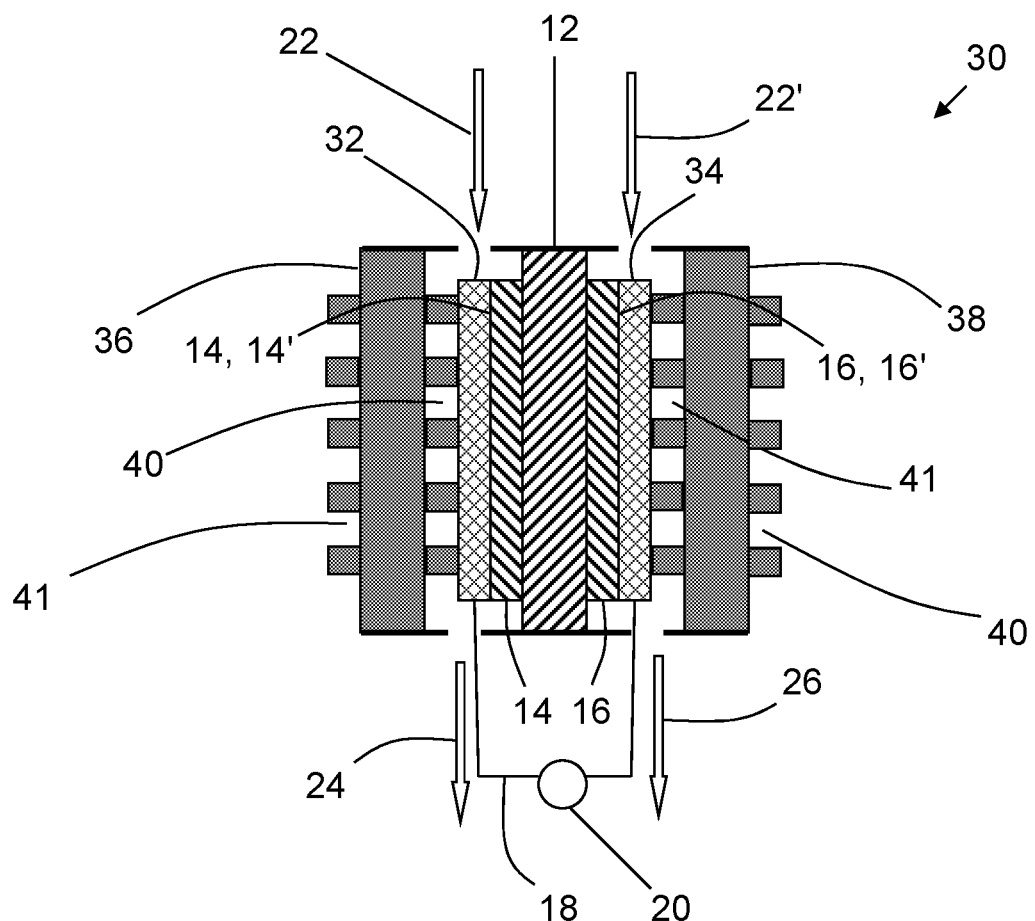
FIG. 3 is a schematic depiction an example embodiment of an electrochemical cell.

FIG. 3 is a schematic depiction of an electrochemical cell 30 as part of a stack containing the components of MEA 10 (FIG. 2) and additional components, with the cells separated by bipolar plates, where numbering from FIG. 2 is carried over. Diffusion layers 32 and 34 are disposed on cathode 14 and anode 16, respectively. Diffusion layers 32, 34 can be configured as an electrically conductive 3-dimensional mesh or screen so that they also provide part of a cathode fluid flow path or anode fluid flow path with the void space in the 3-D mesh or screen, as well as an electrical connection between the electrodes and the bipolar plates 36 and 38. Alternatively, either or both of the diffusion layers 32, 34 can be flat screens, and the anode or cathode flow path can be provided by a separate flow-field structure or by features (e.g., channels) on bipolar plates 36 and 38. The bipolar plates 36 and 38 are each electrically connected to an anode or cathode of adjacent electrochemical cells (not shown), so that the cells of the stack are electrically connected in series. The bipolar plates 36 and 38 can optionally be microporous for transport and management of water from a water circulation loop 42. Additional details regarding such microporous bipolar plates that are disclosed in U.S. Pat. No. 5,503,944 "Water management system for solid polymer electrolyte fuel cell power plants" and U.S. Pat. No. 5,853,909, the disclosures of which are incorporated herein by reference in their entirety. The bipolar plates also have cathode fluid flow channels 40 that provide part of the cathode fluid flow path, and anode fluid flow channels 41 that provide part of an anode fluid flow path. In embodiments where the bipolar plates 36, 38 are microporous, they can be microporous on both sides of the plate or can be microporous on only one side such as the side facing anode 16. The bipolar plates can also include cathode fluid flow channels 40 that provide part of the cathode fluid flow path, and anode fluid flow channels 41 that provide part of an anode fluid flow path. Alternatively, the fluid flow channels 40/41 can be provided by separate structures stacked between the electrode and bipolar separator plates and the electrodes. In some exemplary embodiments, air from air source 22', which can be the same as or different than air source 22, can be introduced to the anode fluid flow path through the current collector 34 and anode fluid flow channels 41, and oxygen-enriched air 26 can be exhausted or recycled to the aircraft cabin. In other exemplary embodiments, the air source 22' is not present, in which case oxygen generated at the anode current collector 34 can be collected in anode fluid flow channels 41 designed for this purpose. The almost pure oxygen that exits the anode as anode exhaust 26 in this case can be exhausted or mixed with fresh air, or recirculated air from a conditioned space such as an aircraft cabin, and recycled to a conditioned space such as an aircraft cabin.

Figure 4:
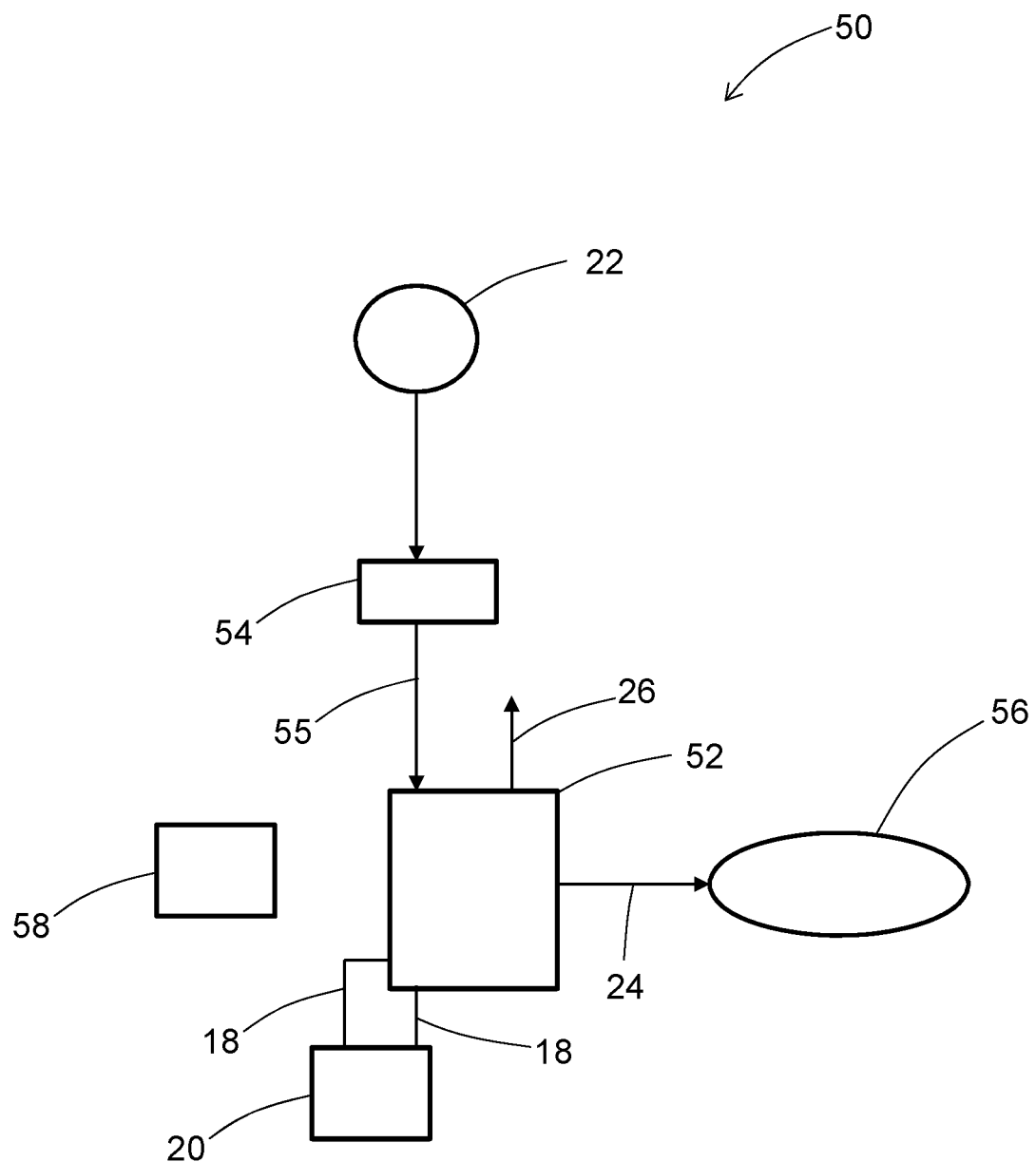
FIG. 4 is a schematic illustration of an example embodiment of an electrochemical fuel-tank inerting system.

Turning now to FIG. 4, there is shown a fuel tank inerting system 50 with an electrochemical cell stack 52 that receives air from air source 22 and is connected to power source 20 through electrical connection 18. Air from the air source 22 is directed by an internal cathode inlet header (not shown) to cathode fluid flow paths along the cathodes in the cell stack, and can also be directed by an internal anode inlet header (not shown) to anode fluid flow paths along the anodes in the cell stack. An optional air processing unit 54 is shown interposed along the flow path from the air source 22 to the electrochemical cell stack 52, which can operate as a carbon dioxide absorber or a water source or both a carbon dioxide and a water source. Carbon dioxide and anions such as carbonate or bicarbonate produced from carbon dioxide can interfere with the ion exchange efficiency of hydroxyl ions through the anion exchange membrane, and a carbon dioxide absorber can remove or reduce undesired carbon dioxide in the cathode side air feed 55. Any type of carbon dioxide absorber can be used, including but not limited to chemical absorbers that contact the airflow with an alkaline material (e.g., granular soda lime) or an alkaline solution (e.g., aqueous sodium hydroxide, aqueous potassium hydroxide), selective or reverse selective membranes that filter out $CO_2$ or remove $CO_2$ across a membrane to a gas stream on the other side of the membrane, or $CO_2$-adsorbing materials such as zeolite or activated carbon. In some embodiments, the $CO_2$ absorber is designed or controlled to provide a target level of $CO_2$ in the cathode side air feed 55 and anode side if there is an anode side flow path inlet, such 100 ppm by weight or less, or 50 ppm by weight or less, or 10 ppm by weight or less. Water sources can include humidifiers, mist injectors, etc. In some embodiments, a water source is designed or controlled to provide a target moisture level to the cathode side air feed 55, e.g., the stoichiometric amount of moisture needed for reaction (1), or a specified amount of moisture in excess of the stoichiometric amount needed for reaction (1). Oxygen-depleted air is discharged from the cathode side of the electrochemical cells in the electrochemical cell stack 52 along the inert gas flow path 24 to the fuel tank(s) 56. In some embodiments, the oxygen-depleted air discharged from the cathode side of the stack can be relatively dry, and water removal is either not needed or can be reduced compared to inert gas-generating technologies such as PEM-based electrochemical cells or catalytic combustion reactors. However, in some embodiments the cathode exhaust can be subjected to an optional water removal stage such as a condenser or desiccant tween the electrochemical cell stack 52 and the fuel tank(s) 56.

Figure 5:
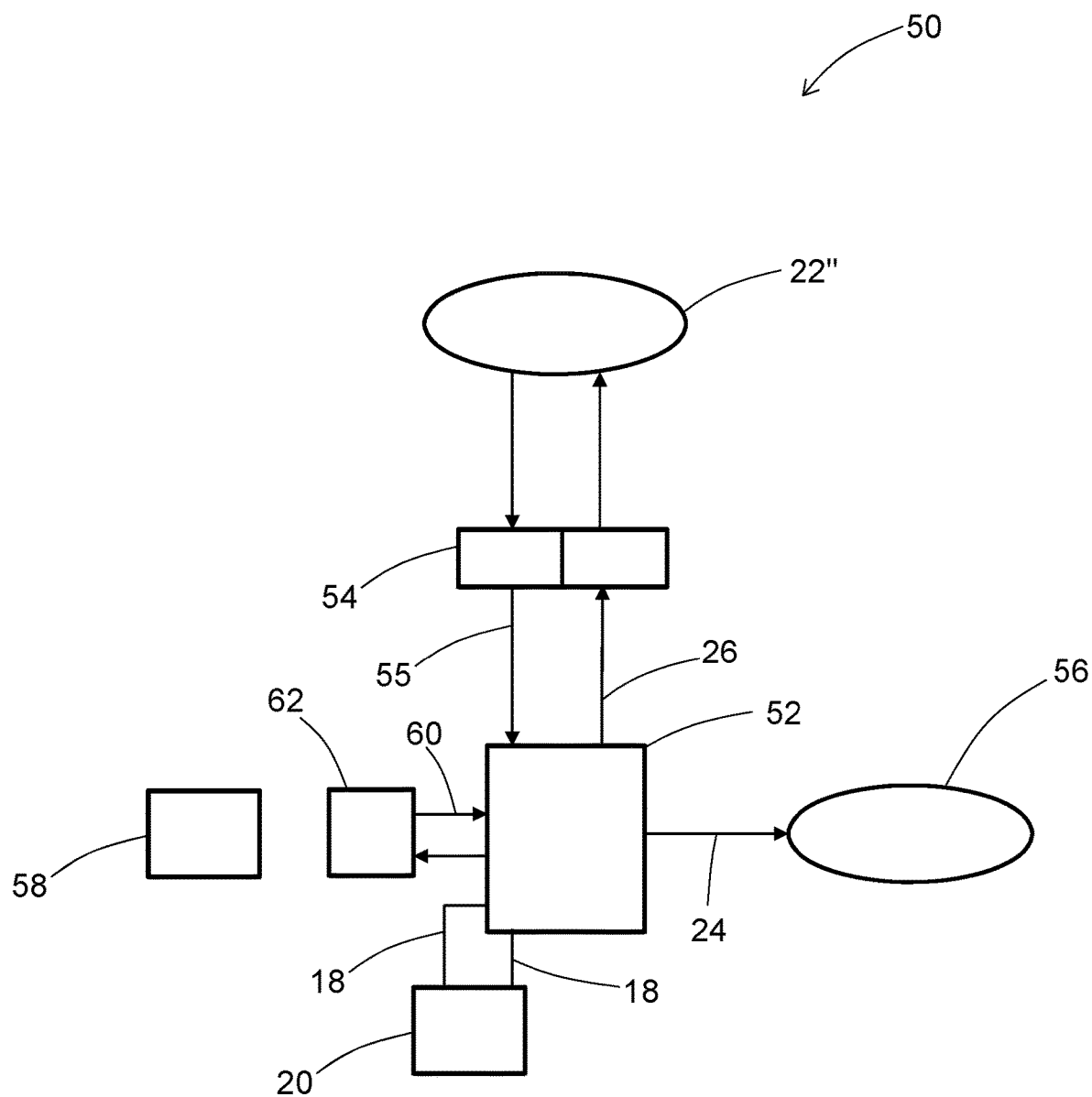
FIG. 5 is a is a schematic illustration of an alternative example embodiment of an electrochemical fuel-tank inerting system.

Turning to FIG. 5, this figure is the same as FIG. 4 except that the air source is an aircraft cabin air circulation flow path 22" and the oxygen-enriched anode discharge 26 is returned to the aircraft cabin circulation flow path 22", and an optional water circulation loop 60 is shown connected to a water reservoir 62 to provide water to the electrochemical cell stack 52. Also, the air processing unit 54 is shown with two portions, a first unnumbered portion that treats the cathode side air feed similarly, and an optional second unnumbered portion that treats the anode side discharge 26 being returned to the cabin air circulation. In some embodiments, the anode side discharge 26 can be subjected to a different treatment protocol before being returned to the cabin air circulation flow path 22", such as a filter to neutralize any hydroxyl ions that did not get oxidized at the anode.

In addition to supplying ODA to the ullage of the fuel tank(s) onboard the aircraft, the ODA may be also be used for other functions, such as serving as a fire-suppression agent. For example, cargo compartments onboard aircraft typically have fire-suppression systems that include a dedicated gas-distribution system comprising tubes routed to nozzles in the cargo bay to deploy fire-suppression agents in the event of a fire. A variety of fire-suppression agents may be deployed depending on the type and extent of the fire. In the case of a fire, all or some of the ODA could be routed to one or more of these fire-suppression distribution systems. This may be especially beneficial during the aircraft descent when the cargo bay is becoming re-pressurized to reduce the ingress of oxygen that can feed the fire. In this case, the system may be operated to produce ODA at the maximum flow rate. The ODA could also be used to enable inerting coverage over extended periods, which may be in addition to, or in lieu of, dedicated low-rate discharge inerting systems in the cargo bay(s).

During operation, the system can be controlled by a controller 58 to set fluid flow rates (e.g. feed rates of air to the cathode 14 or to the anode 16, or of water or water vapor in the air feed to the cathode 14 or $CO_2$ in the air feed to cathode 14 or anode 16, and the current or voltage levels produced by electric power source 20 to produce varying amounts of ODA in response to system parameters. Such system parameters can include, but are not limited to temperature of the fuel in fuel tank(s) 56, oxygen content of the fuel in fuel tank(s) 56, oxygen content of vapor in the ullage of fuel tank(s) 56, and temperature and/or pressure of vapor in the ullage of fuel tank(s) 56, temperature and pressures in the fuel cell stack 52, and temperature, oxygen content, and/or humidity level of the cabin air. Accordingly, in some embodiments, the fuel tank ullage gas management system such as shown in FIGS. 3 and 4 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to a system controller. In some embodiments, the system controller can be dedicated to controlling the fuel tank ullage gas management system, such that it interacts with other onboard system controllers or with a master controller. In some embodiments, data provided by and control of the fuel tank ullage gas management system can come directly from a master controller.

In some embodiments, the system can be operated in an alternate mode as a fuel cell in which fuel (e.g., hydrogen) is delivered to the anode and reacts with hydroxyl ions to form water, while oxygen reacts with water at the cathode to produce hydroxyl ions, and electricity produced by the electrochemical cell is delivered to a power sink such a power-consuming component or an electrical bus connected to one or more power-consuming components. In some embodiments, the system can be operated in a mode selected from a plurality of modes that include at least the above-described power-consuming mode and power-producing (fuel cell) mode (both of which produce ODA at the cathode), and can also optionally include other modes such as a start-up mode. In such embodiments, the electrical connection 18 would provide controllable connection to either the power source 20 or a power sink (not shown).

In some embodiments, various technical effects can be provided, such as reduced water levels in inert gas (i.e., ODA) produced by the system compared to PEM electrochemical cells or catalytic combustion reactors, and a broader range of operating temperatures compared to PEM electrochemical cells and SOFC electrochemical cells, and reduced requirements for compressed air compared to conventional membrane-based oxygen/nitrogen separators.

The term "about", if used, is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel tank inerting system, comprising
   a fuel tank;
   an electrochemical cell comprising a cathode and an anode separated by a separator comprising an anion transfer medium, wherein the anion transfer medium comprises a solid polymer membrane comprising quaternary ammonium groups, quaternary pyridinium groups, quaternary imidazolium groups, amino groups, imidazole groups, or combinations thereof;
   a cathode fluid flow path in operative fluid communication with a catalyst at the cathode between a cathode fluid flow path inlet and a cathode fluid flow path outlet;
   an anode fluid flow path in operative fluid communication with a catalyst at the anode, including an anode fluid flow path outlet;
   an electrical connection to a power source, arranged to provide a voltage difference between the anode and the cathode;
   an air source in operative fluid communication with either or both of the cathode fluid flow path inlet and the anode fluid flow path inlet; and
   an inert gas flow path in operative fluid communication with the cathode fluid flow path outlet and the fuel tank.

2. The fuel tank inerting system of claim 1, wherein the anion transfer medium comprises quaternary ammonium groups.

3. The fuel tank inerting system of claim 1, wherein the anode fluid flow path is in fluid communication with the catalyst at the anode between an anode fluid flow path inlet and the anode fluid flow path outlet.

4. The fuel tank inerting system of claim 1, further comprising a regenerative or replaceable carbon dioxide absorber in operative fluid communication with the air source and the cathode fluid flow path.

5. The fuel tank inerting system of claim 1, further comprising a water source in operative fluid communication with the cathode fluid flow path.

6. A fuel tank inerting and power generation system, comprising
   the fuel tank inerting system of claim 1;
   an electrical connection between a power sink and the anode and cathode; and
   a controller configured to alternatively operate the electrochemical cell in a mode selected from a plurality of modes including at least:
      a first mode in which air and water is directed to the cathode, electric power is directed from the power source to the anode and cathode to provide a voltage difference between the anode and the cathode, and oxygen-depleted air is directed from the cathode to the fuel tank, and
      a second mode in which fuel is directed to the anode, electric power is directed from the anode and cathode to the power sink, and oxygen-depleted air is directed from the cathode to the fuel tank.

7. An aircraft fuel tank inerting system comprising an aircraft body and an engine, said engine in operative fluid communication with the fuel tank of the fuel tank inerting system of claim 1.

8. An aircraft fuel tank inerting and air management system, comprising
   the fuel tank inerting system of claim 1; and
   a cabin air flow circulation path in operative fluid communication with a pressurized environmentally controlled cabin and the anode fluid flow path inlet and anode fluid flow path outlet.

* * * * *